(12) United States Patent
Gioia

(10) Patent No.: US 7,555,168 B2
(45) Date of Patent: Jun. 30, 2009

(54) METHOD OF WAVELET CODING A MESH OBJECT

(75) Inventor: Patrick Gioia, Rennes (FR)

(73) Assignee: France Telecom, Paris (FR)

( * ) Notice: Subject to any disclaimer, the term of this patent is extended or adjusted under 35 U.S.C. 154(b) by 921 days.

(21) Appl. No.: 10/483,441

(22) PCT Filed: Jul. 4, 2002

(86) PCT No.: PCT/FR02/02328

§ 371 (c)(1),
(2), (4) Date: May 28, 2004

(87) PCT Pub. No.: WO03/009234

PCT Pub. Date: Jan. 30, 2003

(65) Prior Publication Data

US 2004/0208382 A1     Oct. 21, 2004

(30) Foreign Application Priority Data

Jul. 10, 2001   (FR) .................................. 01 09184

(51) Int. Cl.
*G06K 9/36*   (2006.01)
(52) U.S. Cl. ..................... 382/240; 382/232; 382/233
(58) Field of Classification Search ............... 382/240, 382/232, 233; 715/255
See application file for complete search history.

(56) References Cited

U.S. PATENT DOCUMENTS

| | | | |
|---|---|---|---|
| 5,548,700 A * | 8/1996 | Bagley et al. ................ | 715/255 |
| 5,995,668 A | 11/1999 | Corset et al. ................ | 382/233 |
| 6,674,911 B1 * | 1/2004 | Pearlman et al. ............ | 382/240 |
| 6,885,774 B2 * | 4/2005 | Ammicht et al. ............ | 382/240 |

FOREIGN PATENT DOCUMENTS

WO     WO 99 49412 A     9/1999

OTHER PUBLICATIONS

"HTTP streaming of JPEG2000 images", Proceedings International Conference on Information Technology; Coding and Computing, Apr. 2, 2001, pp. 15-19.

\* cited by examiner

*Primary Examiner*—Anh Hong Do
(74) *Attorney, Agent, or Firm*—Westman, Champlin & Kelly, P.A.

(57) ABSTRACT

The invention relates to a method for the coding an object having at leas two dimensions which is associated with a basic mesh comprising a set of basic surfaces and with coefficients in a base of wavelets corresponding to local modifications to said basic mesh. The inventive method delivers a global data flow that can be used to reconstruct the object. According to the invention, said wavelet coefficients are partitioned into at least two disjoint subsets each of which is encoded independently. Subsequently, positional data are inserted by the method into the global data flow which can be used to locate wavelet coefficients relative to a portion of the object in said global data flow, in such a way to enable a selective reconstruct of said portion using the coefficients of at least one said subsets.

20 Claims, 2 Drawing Sheets

METHOD OF WAVELET CODING A MESH OBJECT

The field of the invention is that of the encoding of meshed objects with at least two dimensions. More specifically, the invention relates to the representation and encoding of meshes, or of meshed-encoded textures, associated with objects of a graphic scene implementing a method known as a "wavelet" method. The invention can be applied more particularly but not exclusively to second-generation wavelets, presented for example in Wim Sweldens, "The Lifting Scheme: A Construction of Second Generation Wavelets", SIAM Journal on Mathematical Analysis, Volume 29, number 2, pp 511-546, 1998.

The invention can be applied in all fields where it is desirable to optimize the storage and/or the transmission of images. The invention can be applied especially but not exclusively to the, storage and transmission of 3D models, lifting grids, and objects and textures encoded by two-dimensional meshes.

It may be recalled that what are called "wavelet" encoding methods are used to represent a mesh as a succession of details added to a basic mesh. The general theory of this technique is described especially in M. Lounsbery, T. DeRose and J. Warren, "Multiresolution Analysis for Surfaces of Arbitrary Topological Type" (ACM Transactions on Graphics, Vol. 16, No. 1, pp. 34-73, January 1997).

The general principle of this technique consists in developing homeomorphism between an object to be encoded (such as a 3D mesh for example) and a simple mesh (more generally called a "basic mesh") in a base of particular functions, called second-generation wavelets.

In this technique, a mesh is therefore represented by a sequence of coefficients that correspond to the coordinates, in a base of wavelets, of a parametrization of said mesh by a simple polyhedron.

An object encoded according to such a technique thus takes the form of the union of the following two elements:
  the basic mesh, which generally has few facets, and represents a coarse version of the object to be encoded;
  the wavelet coefficients, which are triplets of real numbers assigned simultaneously to a precise zone of a basic mesh and to a given level of subdivision of this mesh. These wavelet coefficients represent the refinements to be made to the zone with which they are associated in order to converge towards the geometry of the initial object.

To enable the reconstruction of the representation of the encoded object on the display terminal, it is necessary to send this display terminal, firstly the basic mesh and, secondly, the associated wavelet coefficients. To this end, a method has to be defined for the efficient encoding of the wavelet coefficients, in order to compress and transmit them, for example by means of communications networks, to the display terminal which may be a remote terminal.

Up till now, it is the encoding technique known as the "zero-trees" encoding technique that gives the best results in terms of compression of the wavelet coefficients to be transmitted. Such a technique consists in describing an order of encoding of the wavelet coefficients. This order is predetermined and known in advance to the sender and receiver terminals (for example a server and a customer display terminal). Such a technique therefore makes it possible, during the transmission of wavelet coefficients, to avoid transmitting information on the ranges of coefficients that are not significant for the encoding of the object considered.

Such "zero-trees" encoding operations are generally coupled with a "bit-plane" encoding operation which makes it possible, during the transmission of the coefficients, to first transmit the most significant bits of each coefficient.

A more detailed description of the "zero-trees" technique will be found in Jerome M. Shapiro, "Embedded Image Coding Using Zerotrees of Wavelet Coefficients" (IEEE Trans. Sig. Proc. 41(12), December 1993) and A. Said, W. A. Pearlman, "A New, Fast, and Efficient Image Codec Based on Set Partitioning in Hierarchical Trees" (IEEE Trans. Circ. System. For Video Tech., 6(3), June 1996).

These techniques, initially developed for the encoding of two-dimensional images, have recently been applied to second-generation wavelet coefficients as described in A. Khodakovsky, P. Schroder and W. Sweldens, "Progressive Geometry Compression" (SIGGRAPH 2000 proceedings) and F. Moran and N. Garcia, "Hierarchical Coding of 3D Models with Subdivision Surfaces" (IEEE ICIP 2000 Proceedings).

In the last two references cited, the encoding technique relies on the arbitrary adoption of a hierarchy between the coefficients of wavelets to be transmitted, making it possible to determine their order of transmission to a remote display or storage terminal. This order, which is known to the receiver terminal, enables it to reconstruct the entire object transmitted.

One drawback of these prior art techniques is that the server in charge of the transmission of the wavelet coefficients to a display terminal cannot select the coefficients that it wishes to send, and therefore systematically transmits all the coefficients to the customer terminal.

Now, it often happens that the customer needs to receive only the refinements associated with a portion of the basic mesh. For example, when making a virtual visit of a museum, a customer may initially wish to look at an overall view of the sculpture and then at only a detail of the face. All that he needs therefore are the wavelet coefficients corresponding to the refinements of the basic mesh on this portion of the face.

With the use of the prior art techniques, it is impossible for the server to pick out the unnecessary coefficients and send only the encoding portion corresponding to the zone that the customer wishes to view.

One drawback of these prior art techniques therefore is that the customer receives all the wavelet coefficients, including those corresponding to the encoding of the portions of the object that he does not wish to view and does not need.

The communications network used for the transmission of the wavelet coefficients is therefore unnecessarily burdened, and the bit rate of transmission of the payload coefficients drops accordingly.

Furthermore, if the display terminal has low processing capacities, then the reconstruction of a view of the object using all the wavelet coefficients becomes a lengthy process, and this is disagreeable to the customer.

Another drawback of these prior art techniques therefore is that if the customer wishes to carry out an adaptive decoding so as to display only those portions of the object that are valuable to him, then he must himself sort out the wavelet coefficients transmitted. The customer must therefore decode the entire data stream transmitted by the server or coming from a data carrier, and then judge the relevance of the wavelet coefficients thus decoded as a function of the portion of the mesh with which they are associated.

As a consequence, one drawback of these prior art techniques is that, to carry out adaptive decoding, the customer must have a display terminal available with sufficient processing capacities to carry out the operations of decoding the total stream, selecting the relevant coefficients and reconstructing a representation of the object from the coefficients thus selected.

In other words, one drawback of these prior art techniques is that it is impossible for a customer having a display terminal with limited processing capacities to carry out adaptive decoding.

It is a goal of the invention especially to overcome these drawbacks of the prior art.

More specifically, it is a goal of the invention to implement a technique for the encoding of an object by wavelets, enabling a display terminal to carry out the decoding of the object.

Another goal of the invention is to provide a technique for the wavelet encoding of an object, enabling a server to select certain wavelet coefficients, and transmit the selected coefficients as a function of a zone of the basic mesh with which they are associated. In particular, it is a goal of the invention to enable a server to transmit only certain wavelet coefficients, as a function of a customer's request.

It is yet another goal of the invention to implement a technique for the encoding of meshes representing 3D objects or scenes, the technique enabling an adaptive reconstruction of a mesh within a display terminal.

It is another goal of the invention to provide a technique for the wavelet encoding of an object, the technique being adapted to display terminals having low processing capacities.

It is yet another goal of the invention, naturally, to provide a technique for the reconstruction and transmission, through a communications network, of an object encoded according to this encoding method. In particular, during a transmission of this kind, it is a goal of the invention not to unnecessarily burden the communications networks.

It is yet another goal of the invention to implement a technique for the wavelet encoding of an object that is adapted to transmission through a communications network with low bit rate.

BRIEF SUMMARY OF THE INVENTION

These goals, as well as others that shall appear here below, are achieved by means of a method for the encoding of an object with at least two dimensions, that is associated with a basic mesh consisting of a set of basic facets, and with coefficients in a base of wavelets corresponding to local modifications in said basic mesh, said method delivering a total data stream that can be used to reconstruct said object.

According to the invention, said wavelet coefficients are partitioned into at least two separated subsets each undergoing an independent encoding, and said method inserts positioning data in said total data stream, enabling the identification of wavelet coefficients relative to a portion of said object in said total data stream, so as to enable a selective reconstruction of said portion by means of the coefficients of at least one of said subsets.

Thus, the invention is based on an entirely novel and inventive approach to the wavelet encoding of an object and to the shaping of the data thus encoded within a total data stream.

Indeed, the invention relies especially on the generation of a total data stream within which the wavelet coefficients can easily be identified as a function of the portion of the meshed object with which they are associated. This is made possible especially, in the context of the invention, by the insertion of the positioning data within the data stream so as to enable an adaptive display of the encoding object by a customer terminal.

Advantageously, each of said separated subsets is a basic facet.

It is thus easy, within the total data stream, to identify the wavelet coefficients associated with each of the basic facets through the presence, in the stream, of positioning data. It is thus possible to selectively reconstruct a portion of a meshed object, from wavelet coefficients associated with the facet or facets of the portion considered.

Preferably, said encoding implements the following steps:
the detection of at least one non-significant part;
the specific processing of each of said non-significant parts.

Indeed, an encoding of the subset of wavelet coefficients (namely a conversion of these coefficients into a binary sequence) taking account of the non-significant parts makes it possible to achieve a better compression rate of these coefficients with a view to their transmission.

Preferably, said encoding implements a "zero-tree" type of technique.

Indeed, to date, the "zero-tree" technique is the one that gives the best compression results. It is of course also possible to envisage the use of any other technique for the encoding of wavelet coefficients within the total data stream, adapted to the implementation of the invention.

According to a first variant of the invention, said total data stream comprises a header, comprising at least certain of said positioning data, and a wavelet coefficient zone, comprising a sub-zone identified by said positioning data for each of said separated subsets.

Thus, if the list of the wavelet coefficients has been partitioned into N subsets, each corresponding to a portion of the meshed object, the zone of wavelet coefficients of the total data stream comprises N sub-zones, identifiable within the stream, by means of the positioning data.

It will be noted here that the positioning data enabling the identification of a sub-zone of the stream may be included in the header and/or in any other part of the data stream.

Advantageously, said positioning data contained in said header identify a sub-zone, in defining a distance between the position of an identified element and the starting point of said sub-zone in said stream.

An identified element of this kind may be, for example, the starting point or the end of the header, or any other element whose position in the stream can easily be known. The distance may be expressed, for example, in numbers of bits.

Advantageously, said header furthermore comprises at least certain pieces of the information belonging to the group comprising:
the number of basic facets;
the type of wavelets;
information on said object;
information on the encoding of said positioning data.

This information can be exploited by a display terminal for the reconstruction, from the stream, of a representation of a portion or of the totality of the meshed object.

According to a second variant of the invention, said total data stream comprises at least one zone of wavelet coefficients, comprising a sub-zone identified by said positioning data for each of said separated subsets, said positioning data comprising at least one marker at the starting point and/or at the end of each of the sub-zones.

Thus, the positioning data are distributed throughout the total data stream, and are not grouped together in a header, as was the case previously.

Preferably, said sub-zones are organized in said stream by rising order of basic facet.

Thus, when each of the basic facets undergoes an independent encoding (for example of the "zero-tree" type) it is provided that the sub-zones will be arranged within the stream as a function of the ordinal number of the basic facet with which they are associated, for example in rising order.

The invention also relates to a method for the transmission of a data stream between, firstly, at least one server and/or at least one data carrier and, secondly, at least one display terminal, said data stream enabling the reconstruction of an object associated firstly with a basic mesh constituted by a set of basic facets and, secondly, coefficients in a wavelet base corresponding to local modifications in said basic mesh.

According to the invention, a method of transmission of this kind comprises:
- a step for the reception of a request defining a portion of said object to be viewed;
- a step for the analysis of positioning data present in said stream, as a function of said request, making it possible to identify wavelet coefficients relative to said portion in said data stream;
- a step for the extraction of said identified wavelet coefficients to form a reduced data stream;
- a step for the transmission of said reduced data stream.

Thus, a server, upon the reception of a request from a customer on a portion of the object, may make a selection, within the total data stream, of the subset or subsets of coefficients associated with the portion of the object considered. It can then construct a reduced stream, from the coefficients of the subset or subsets concerned, and transmit it to the customer's display terminal.

The invention also relates to a signal representing an object associated with a basic mesh consisting of a set of basic facets, and with coefficients in a base of wavelets corresponding to local modifications in said basic mesh, comprising at least one zone of wavelet coefficients and at least one positioning zone, comprising positioning data enabling the identification of the wavelet coefficients pertaining to a portion of said object and said signal.

According to a first embodiment of the invention, said wavelet coefficients being partitioned into at least two separated subsets each undergoing an independent encoding operation, a signal of this kind comprises a header comprising at least certain of said positioning data, and a zone of wavelet coefficients, comprising a sub-zone identified by said positioning data for each of said subsets.

According to a second embodiment of the invention, said wavelet coefficients being partitioned into at least two separated subsets each undergoing an independent encoding, a signal of this kind comprises at least one zone of wavelet coefficients, comprising a sub-zone identified by said positioning data for each of said subsets, said positioning data comprising at least one marker at the starting point and/or at the end of each of the sub-zones.

The invention also relates to a data carrier designed for the storage of at least one object encoded according to the method described here above.

The invention also relates to a system for the transmission of a data stream between, firstly, at least one server and/or at least one data carrier, and, secondly, at least one viewing terminal, said data stream enabling the reconstruction of an object associated firstly with a data stream constituted by a set of basic facets and, secondly, coefficients in a base of wavelets corresponding to local modifications in said basic mesh.

According to the invention, such a system comprises
- means for the reception of a request defining a portion of said object to be displayed;
- means for the analysis of positioning data present in said stream, as a function of said request, enabling the identification of the wavelet coefficients relative to said portion in said data stream;
- means for the extraction of said identified wavelet coefficients to form a reduced data stream;
- means for the transmission of said reduced data stream.

The invention also relates to a terminal for the display of an object associated with a basic mesh constituted by a set of basic facets and with coefficients in a base of wavelets corresponding to local modifications in said basic mesh, comprising means for the reception of a total data stream enabling the reconstruction of said object, furthermore comprising means for the formulation of a request defining a portion of said object to be viewed intended for a server and/or a data carrier for the reconstruction of said portion from a reduced data stream, comprising wavelet coefficients relative to said portion, received from said server and/or said data carrier.

A terminal of this kind therefore differs very greatly from the prior art display terminals. Indeed, such a terminal may send a request to the server, identifying the portion or portions of the meshed object that the customer wishes to view and, using only the wavelets associated with this portion or portions, that it will have decoded beforehand, reconstruct a representation corresponding to the portion or portions of the object. A terminal of this kind therefore differs from the prior art terminals in that it no longer decodes the entirety of a total data stream to be able to select the wavelet coefficients associated with a portion of the object and reconstruct the representation of this portion.

The invention also relates to a server comprising means for the storage of at least one object encoded according to the encoding method described here above and transmission means implementing the transmission method described here above.

The invention finally relates to a device for the encoding of an object associated with a basic mesh constituted by a set of basic facets, and with coefficients in a wavelet base corresponding to local modifications in said basic mesh, said device generating a total data stream enabling the reconstruction of said object, partitioning said wavelet coefficients into at least two separated subsets, and applying an independent encoding to each of said subsets, and comprising means for the insertion, in said total data stream, of positioning data enabling the identification of the wavelet coefficients relative to a portion of said objects in said total data stream, so as to enable a selective reconstruction of said portion by means of coefficients of at least one of said subsets.

BRIEF DESCRIPTION OF THE DRAWINGS

Other features and advantages of the invention shall appear more clearly from the following description of a preferred embodiment, given by way of a simple non-restrictive illustration and from the appended drawings, of which.

DETAILED DESCRIPTION OF PREFERRED EMBODIMENTS

The general principle of the invention is based on the insertion of positioning data within a data stream generated during the wavelet encoding of a meshed object with at least two dimensions, so as to enable a selection and a selective transmission of the coefficients as a function of the zone of the object with which they are associated.

Figure 1:
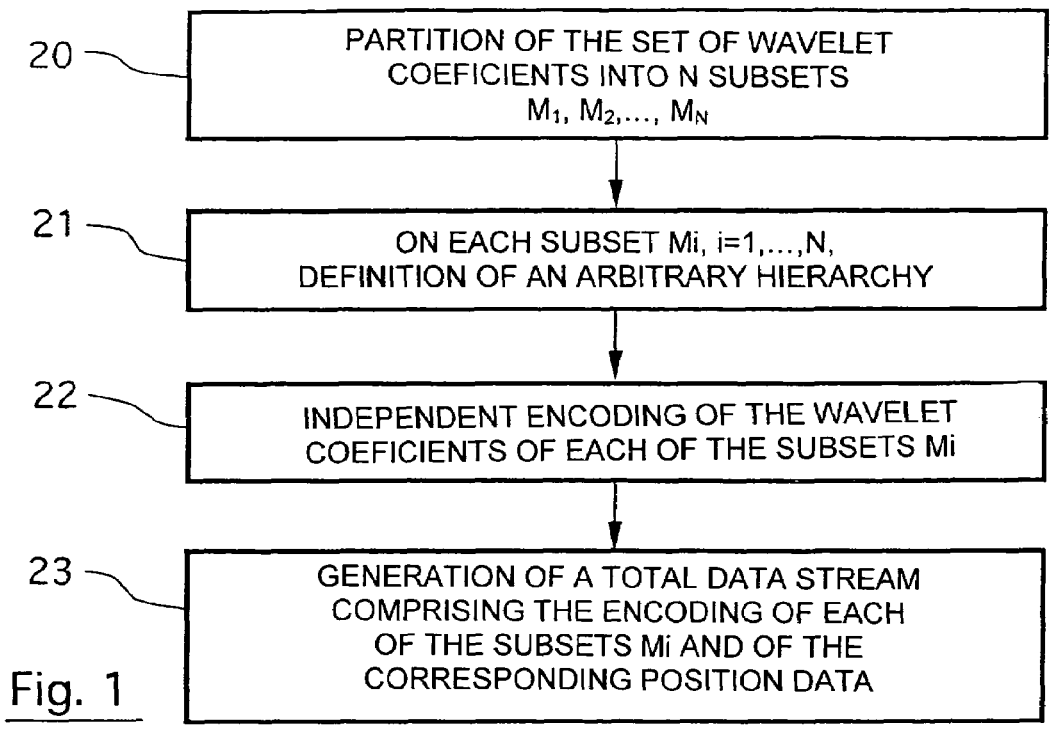
FIG. 1 is a block diagram of the different steps implemented during the encoding of a meshed object with at least two dimensions according to the invention.

Referring now, to FIG. 1, a particular embodiment of the encoding method of the invention is presented.

Here we shall consider the case of an object with at least two dimensions encoded according to a method known as the "wavelet" method. It may be recalled that, according to such a method, the object has, associated with it, a basic mesh and a plurality of wavelet coefficients corresponding to the refinements to be made to the basic mesh to reconstruct a representation of the object. Each node of the basic mesh is therefore associated with a wavelet coefficient.

It is assumed that the steps of constructing the basic mesh and determining the associated wavelet coefficients have already been implemented by the encoding device which therefore has available a list of wavelet coefficients associated with the object to be encoded. It may be recalled that the wavelet coefficient is a triplet of real numbers (x, y, z), accompanied by a piece of information on spatial and frequency positioning I by which it is possible to know which wavelet a coefficient is associated with. This information I may be, for example, a quadruplet (F0, a, b, c), where F0 represents a facet of the basic mesh, and (a, b, c) represents barycentric coordinates on the face.

During a step referenced 20, the encoding device partitions all the wavelet coefficients associated with the meshed object to be encoded into subsets $M_1, M_2, \ldots, M_N$. These subsets are preferably separated. They may be constructed, for example, as a function of visual criteria. Each of them has wavelet coefficients enabling the reconstruction of a representation of a portion of the meshed object to be encoded.

For example, if the meshed object to be encoded is a human or similar character in three dimensions, it is possible to envisage partitioning the list of wavelet coefficients into five subsets corresponding respectively to the subject's face, limbs and bust.

During a step referenced 21, on each subset $M_i$, the encoding device defines an arbitrary hierarchy in determining links of parenthood between the different vertices of the subsets as the case may be. Naturally, there is not necessarily any relationship of parenthood between the two vertices of a same subset which may be sibling vertices.

The encoding device then performs (22) an independent encoding of the wavelet coefficients of each of the subsets $M_i$, for i varying from 1 to N. Such an encoding is, for example, a "zero-tree" type encoding, and enables the compression of the representation of the wavelet coefficients, and therefore of the associated mesh nodes, of each of the subsets $M_i$.

During a step referenced 23, the encoding device generates a total data stream comprising, firstly, the result of the encoding (for example of the "zero-tree" type) of each of the subsets $M_i$, and, secondly, positioning data to determine the position of each of the subsets $M_i$ in the stream.

The structure of such a stream gives greater flexibility in the sending of one or more subsets $M_i$ to a display terminal as a function of a request from a customer.

Figure 2:
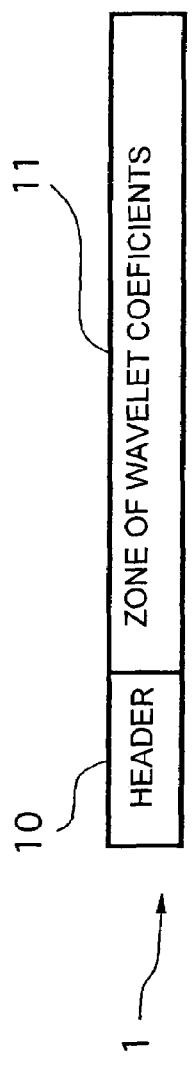
FIG. 2 illustrates an exemplary structure of the data stream generated during the encoding presented in FIG. 1, and comprising positioning data according to a first variant of the invention.

Referring to FIG. 2, we now present an embodiment of a data stream 1, generated according to the method of FIG. 1.

For simplicity's sake, here below in the document, the description is limited to the case where each of the subsets $M_i$ comprises the wavelet coefficients associated with a basic facet of the object. It will of course be easy for those skilled in the art to generalize the following description to the case where a subset $M_i$ comprises wavelet coefficients associated with a plurality of basic facets, or a plurality of nodes of the basic mesh.

It is assumed here and throughout the rest of the document that the facets of the basic mesh are arranged in rising order. For example, an initial facet is arbitrarily selected, and an order of going through all the basic facets (for example in the trigonometric or anti-trigonometric direction) is selected, so that the initial facet is considered to be the first facet, and so on and so forth up to the last facet of the basic mesh scanned in the order of scanning, which becomes the $M^{th}$ basic facet.

According to the invention, a data stream 1 is generated by the encoding device during the wavelet encoding of an object, for example a 3D object. In one particular embodiment of the invention, the data stream 1 comprises a header 10, and a zone of wavelet coefficients 11.

The zone of wavelet coefficients 11 is preferably divided into a plurality of sub-zones (not shown in FIG. 1,), each grouping the wavelet coefficients associated with a facet of the basic mesh of the object. As recalled here above, a wavelet coefficients is a triplet of real numbers (x, y, z), accompanied by a piece of information I on spatial and frequency position, by which it is possible to know the wavelet with which a coefficient is- associated. This piece of information I may be, for example, a quadruplet (F0, a, b, c) where F0 represents the facet of the basic mesh, and (a, b, c) represents barycentric coordinates on this face.

In a preferred embodiment of the invention, each sub-zone comprises the "zero-tree" encoding of the wavelet coefficients associated with a basic facet. Thus a partitioning of the wavelet coefficients is made along the facet F0 with which they are associated, and as many "zero-tree" encoding operations are performed as there are partitions. (It may be recalled that, in another embodiment of the invention described with reference to FIG. 1, the coefficients are partitioned into a plurality of subsets $M_i$, where one and the same subset can group together several basic facets F0, and an independent "zero-tree" encoding is performed on each of the subsets $M_i$. Each subset then comprises the "zero-tree" encoding of the wavelet coefficients associated with a subset $M_i$). It is of course also possible to envisage the use of any other encoding technique providing for, satisfactory compression and transmission of the wavelet coefficients. The encoding technique used will preferably be a technique that enables a specific encoding of the non-significant parts of the object considered.

The header 10 comprises positioning data used to identify each of the sub-zones within the zone of wavelet coefficients 11. It furthermore comprises information on the type of encoding implemented, such as information on the type of wavelet functions used, the number of wavelet coefficients, the characteristics of the basic mesh (the number of basic facets, etc), or again the maximum level of subdivision of the basic mesh.

Figure 3:
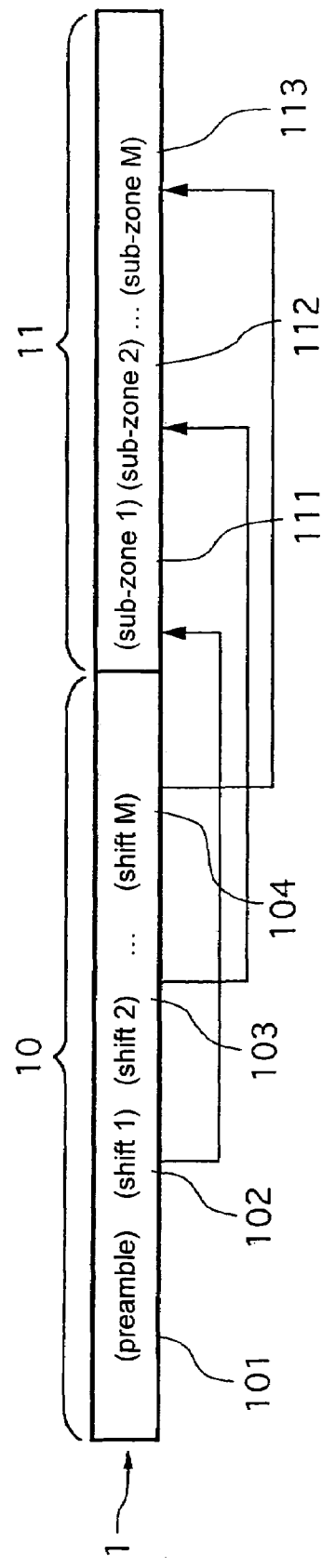
FIG. 3 provides a detailed view of the structure of the data stream of FIG. 2 when the positioning data indicate a distance within the stream.

In the particular exemplary embodiment presented with reference to FIG. 3, the zone of the wavelet coefficients 11 is divided into a plurality of sub-zones referenced 111 to 113. Thus the sub-zone referenced 111 is the "sub-zone 1" associated with the first facet of the basic mesh, the sub-zone referenced 112 is associated with the second basic facet, and the sub-zone referenced 113 is associated with the $M^{th}$ basic facet. It will be noted of course that for the sake of the simplicity of the figure, not all the sub-zones have been shown.

The header 10 has a preamble 101, and a plurality of positioning data referenced 102 to 104. The preamble 101 comprises, for example, data on the type of mesh and the type of wavelets used, mentioned here above.

The zone referenced 102, called "shift 1", provides information on the position of the wavelet coefficients associated with the first basic facet in the binary stream 1, i.e. it provides information for example on the distance between the end of the preamble 101 and the starting point of the "sub-zone 1" referenced 111.

In a particular embodiment of the invention, such a distance is expressed in numbers of bits. In another embodiment of the invention, the positioning data zone referenced 102 may of course also provide information on the distance between the starting point of the "sub-zone 1" referenced 111 and any other reference element of data stream 1, so as to enable the positioning of the wavelet coefficients of the "sub-zone 1" 111 in the bit stream 1.

In FIG. 3, the "shift 2" zone 103 (and the "shift M" zone 104 respectively) provide information on the number of bits between the starting point of the "sub-zone 2" 112 (and the "sub-zone M" 113 respectively) and the end of the preamble 101.

Thus, when a server, in response to a request from a customer terminal, wishes to send this terminal the wavelet coefficients associated with the $M^{th}$ basic facet, it consults the "shift M" positioning data 104 of the header 10. The "shift M" zone 104 informs the server of the number of bits between the end of the preamble 101 and the starting point of the "sub-zone M" 113, and the server can therefore take position directly at the starting point of the "sub-zone M" 113, so as to extract and then transmit these coefficients alone to the customer terminal.

Figure 4:
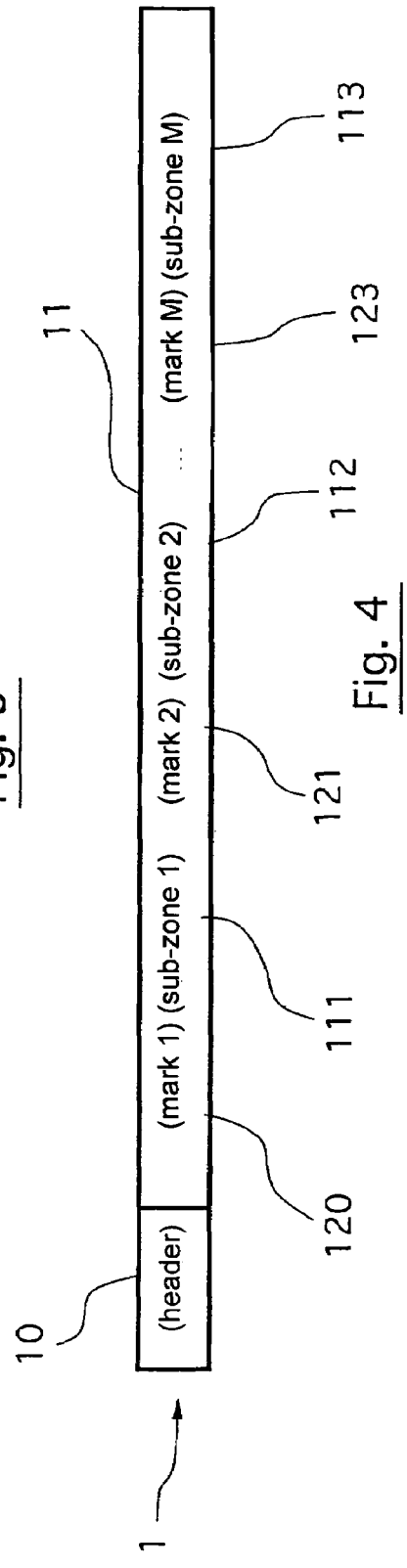
FIG. 4 describes an exemplary structure of a data stream generated during the encoding of the meshed object with at least two dimensions, comprising positioning data distributed within the stream according to a second variant of the invention.

The data stream 1 of FIG. 4 comprises a header 10 and a zone of wavelet coefficients 11, comprising firstly sub-zones of wavelet coefficients referenced 111 to 113 and zones of positioning data referenced 120 to 123. In such an alternative embodiment, the positioning data referenced 120 to 123 are therefore distributed in the data stream 1, and not assembled in the header 10 as above.

The positioning data 120 to 123 are, for example, markers indicating the starting point and/or the end of the sub-zone of wavelet coefficients. Thus, the zone "mark 1" referenced 120 indicates the starting point of the "sub-zone 1" 111, comprising the wavelet coefficients associated with the first facet of the basic mesh. The zone "mark 2" referenced 121 marks the starting point of the "sub-zone 2" referenced 112, and the zone "mark M" referenced 123 marks the starting point of the "sub-zone M" referenced 113.

In one particular embodiment of the invention, the information contained in the zones "mark 1" 120, "mark 2" 121 and so on and so forth until "mark M" 123 are identical. In other words, a plurality of identical markers is inserted in the zone of wavelet coefficients 11 of the data stream 1 so as to separate the different sub-zones each associated with a facet of the basic mesh. Thus, when a server wishes to send the wavelet coefficients associated with the "sub-zone M" 113 to a display terminal, it scans the entire stream 1 and counts the markers that it has encountered so as to determine which is the $M^{th}$ marker 123, and also determine the starting point of the "sub-zone M" 113, comprising the "zero-tree" encoding of the wavelet coefficients associated with the $M^{th}$ basic facet. Thus, the customer terminal receives only the wavelet coefficients of the "sub-zone M" 113, and does not need to decode the entire stream 1 to access the wavelet coefficients that it needs.

In another embodiment of the invention, the markers referenced 120 to 123 are specific to a given sub-zone of the zone of wavelet coefficients 11. The marker "mark 1" 120 specifically indicates the starting point of the "sub-zone 1" 111, the marker "mark 2" 121 specifically indicates the starting point of the "sub-zone 2" 112, and so on and so forth. (It is of course possible to envisage, for example, a situation where the markers referenced 120 to 123 indicate the end of the associated sub-zones 111 to 113.)

Thus, a server wishing to transmit the coefficients of the "sub-zone M" 113 in response to a request from a customer goes through the data stream 1, until it identifies the marker "mark M" 123, and deduces the position of the starting point of the "sub-zone M" 113 therefrom.

It is again possible to envisage any other embodiment of the invention that is not shown in FIGS. 3 and 4 but enables the construction of a data stream 1, in which there are inserted positioning data enabling a server to determine the position of a sub-zone of wavelet coefficients associated with a basic facet, or more generally with the sub-set $M_i$ grouping together a plurality of nodes or basic facets, with a view to its extraction and selective transmission in response to a request from a customer.

For example, it is possible to envisage an embodiment combining the alternative embodiments of the invention shown with reference to FIGS. 3 and 4, in which the sub-zone referenced 111 to 113 would be grouped together in sets of three or four sub-zones. Positioning data, inserted in the header 10, would provide information on the distance between a referenced element (for example the end of the preamble 101) and the starting point of a set of sub-zones. Markers would be inserted in a set of this kind, so as to indicate the starting point and/or the end of each of the sub-zones of the entire unit.

Thus, through the positioning data located in the header 10, a server can get positioned directly at the starting point of the set of sub-zones, and then scan the set and, through the markers, determine the position of the sub-zone or sub-zones of the set that it must transmit in response to a request from a customer.

Figure 5:
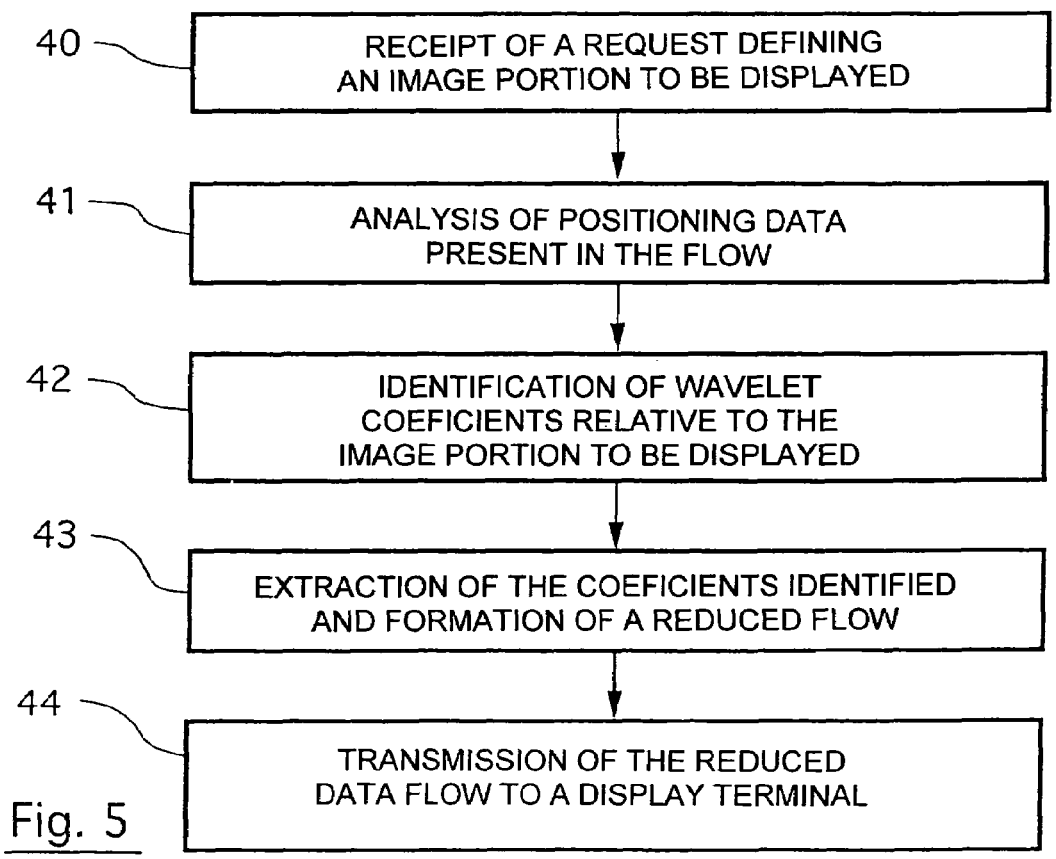
FIG. 5 is a block diagram of the different steps implemented by the transmission server of the data stream of the FIGS. 2 to 4, upon reception of a request from a customer terminal.

Here below, referring to FIG. 5, we shall present the different steps implemented by a server, or by a terminal that is connected to a data carrier and is responsible for transmitting the associated wavelet coefficients to a zone of the basic mesh, in response to a request from a customer. For simplicity's sake, the description shall be limited here below to processing operations implemented by a server in response to a request from a display terminal. Those skilled in the art will easily deduce the processing operations to be performed when the object data come from a data carrier connected directly or indirectly to the display terminal.

It is assumed that the customer wishes to look at a detail of the scene that he is viewing on his terminal. The terminal therefore sends the server a request specifying the portion of the scene for which he wishes to obtain the wavelet coefficients determining the refinements to be made in the basic mesh to obtain a satisfactory reconstruction of the portion.

During a step referenced 40, the server receives the request from the customer terminal, and determines the facets of the basic mesh concerned by the request. During a step referenced 41, the server scans the data-stream generated at output of a device for encoding the scene, and analyses the positioning data present in this stream. For example, it consults the positioning data contained in the header of the stream.

During a step referenced 42, it determines the position of the sub-zones of wavelet coefficients associated with the portion of the scene considered, as a function of the positioning data that it has analyzed earlier. After identification (42) of the wavelet coefficients pertaining to the object portion to be viewed, the server extracts (43) these coefficients from the total data stream so as to form a reduced stream intended for the customer terminal.

During a step referenced 44, the server sends this reduced stream to the customer's display terminal, so that the terminal can reconstruct the portion of the scene that the customer wishes to view, without having to decode the entire total data stream.

The invention claimed is:

1. A method comprising:
   encoding an object with at least two dimensions by a server or a first terminal, wherein the object is associated with a basic mesh comprising a set of basic facets, and with coefficients in a base of wavelets corresponding to local modifications in the basic mesh, wherein the wavelet coefficients are partitioned into at least two separated subsets each undergoing an independent encoding,
   delivering to a second, display terminal a total data stream that can be used to reconstruct the object by the second, display terminal, and
   inserting positioning data in the total data stream, enabling identification of wavelet coefficients relative to a portion of the object in the total data stream, so as to enable a selective reconstruction of the portion by the coefficients of at least one of the subsets.

2. The method according to claim 1, wherein each of the separated subsets is a basic facet.

3. The method according to claim 1, wherein the encoding implements the following steps:
   detection of at least one non-significant part;
   specific processing of each of non-significant parts.

4. The method according to claim 1, wherein the encoding implements a "zero-tree" type of technique.

5. The method according to claim 1, wherein the total data stream comprises a header, comprising at least certain of the positioning data, and a wavelet coefficient zone, comprising a sub-zone identified by the positioning data for each of the separated subsets.

6. The method according to claim 5, wherein the positioning data contained in the header identify a sub-zone, in defining a distance between the position of an identified element and a starting point of the sub-zone in the stream.

7. The method according to claim 5, wherein the header further comprises at least some pieces of information belonging to the group comprising:
   number of basic facets;
   type of wavelets;
   information concerning the object;
   information concerning the encoding of the positioning data.

8. The method according to claim 1, wherein the total data stream comprises at least one zone of wavelet coefficients, comprising a sub-zone identified by the positioning data for each of the separated subsets, the positioning data comprising at least one marker positioned at at least one of a starting point or an end of each of the sub-zones.

9. The method according to claim 5, wherein the sub-zones are organized in the stream by rising order of basic facet.

10. A method for transmission of a data stream between, firstly, at least one server or at least one data carrier and, secondly, at least one display terminal, the data stream enabling reconstruction of an object associated firstly with a basic mesh constituted by a set of basic facets and, secondly, coefficients in a wavelet base corresponding to local modifications in the basic mesh, the method being characterized by:
    a step of reception of a request defining a portion of the object to be viewed;
    a step of analysis of positioning data present in the stream, as a function of the request, allowing identify of wavelet coefficients relative to the portion in the data stream;
    a step of extraction of the identified wavelet coefficients to form a reduced data stream;
    a step of transmission of the reduced data stream.

11. A method comprising:
    producing, by a server or a first terminal, a signal representing an object associated with a basic mesh comprising a set of basic facets, and with coefficients in a base of wavelets corresponding to local modifications of the basic mesh,
    wherein the signal comprises at least one zone of wavelet coefficients and at least one positioning zone, comprising positioning data enabling identification of the wavelet coefficients pertaining to a portion of the object in the signal,
    sending the signal to a second terminal.

12. The method according to claim 11, wherein the wavelet coefficients are partitioned into at least two separated subsets, each undergoing an independent encoding operation, and wherein the signal comprises a header comprising at least some of the positioning data, and a zone of wavelet coefficients, comprising a sub-zone identified by the positioning data for each of the subsets.

13. The method according to claim 11, wherein the wavelet coefficients are partitioned into at least two separated subsets each undergoing an independent encoding, and wherein the signal comprises at least one zone of wavelet coefficients, comprising a sub-zone identified by the positioning data for each of the subsets, the positioning data comprising at least one marker positioned at at least one of a starting point or an end of each of the sub-zones.

14. A total data stream recorded on a carrier usable in a computer, wherein:
    the total data stream is configured to enable reconstruction of an encoded object with at least two dimensions, that is associated with a basic mesh constituted by a set of basic facets, and comprises coefficients in a base of wavelets corresponding to local modifications in the basic mesh,
    the wavelet coefficients are partitioned into at least two separated subsets each undergoing an independent encoding, and
    in the total data stream, there are inserted positioning data enabling identification of the wavelet coefficients relative to a portion of the object in the total data stream, so as to enable a selective reconstruction of the portion by the coefficients of at least one of the subsets.

15. The data stream according to claim 14, wherein the data stream enables the reconstruction of an object with at least two dimensions encoded with a basic mesh consisting of a set of basic facets, and with coefficients in a base of wavelets corresponding to local modifications in the basic mesh, wherein the wavelet coefficients are partitioned into at least two separated subsets each undergoing an independent encoding, and positioning data are inserted in the total data stream, enabling the identification of wavelet coefficients relative to a portion of the object in the total data stream.

16. A system for transmission of a data stream between, firstly, at least one server or at least one data carrier, and, secondly, at least one viewing terminal, the data stream enabling reconstruction of an object associated firstly with a data stream constituted by a set of basic facets and, secondly, coefficients in a base of wavelets corresponding to local modifications in the basic mesh, wherein the system comprises:

means for reception of a request defining a portion of the object to be displayed;

means for analysis of positioning data present in the stream, as a function of the request, enabling identification of the wavelet coefficients relative to the portion in the data stream;

means for extraction of the identified wavelet coefficients to form a reduced data stream;

means for the transmission of the reduced data stream.

17. A terminal for display of an object associated with a basic mesh constituted by a set of basic facets and with coefficients in a base of wavelets corresponding to local modifications of the basic mesh, wherein the terminal comprises:

means for reception of a total data stream enabling the reconstruction of the object, means for formulation of a request defining a portion of the object to be viewed intended for a server or a data carrier for reconstruction of the portion from a reduced data stream, comprising wavelet coefficients relative to the portion, received from the server or the data carrier.

18. A server comprising:

means for storage; and at least one encoded object stored on the storage means, wherein the at least one object has at least two dimensions and is associated with a basic mesh comprising a set of basic facets, and with coefficients in a base of wavelets corresponding to local modifications in the basic mesh, the at least one encoded object being encoded according to a method delivering a total data stream that can be used to reconstruct the object, wherein the wavelet coefficients are partitioned into at least two separated subsets each undergoing an independent encoding, and positioning data are inserted in the total data stream, enabling identification of wavelet coefficients relative to a portion of the object in the total data stream, so as to enable a selective reconstruction of the portion by the coefficients of at least one of the subsets.

19. The server of claim 18 further comprising transmission means for transmitting a data stream enabling reconstruction of an object associated firstly with a basic mesh constituted by a set of basic facets and, secondly, coefficients in a wavelet base corresponding to local modifications in the basic mesh, the transmission means comprising:

means for reception of a request defining a portion of the object to be viewed;

means for analysis of positioning data present in the stream, as a function of the request, allowing identify of wavelet coefficients relative to the portion in the data stream;

means for extraction of the identified wavelet coefficients to form a reduced data stream;

means for transmission of the reduced data stream.

20. A device for encoding of an object with at least two dimensions associated with a basic mesh constituted by a set of basic facets, and with coefficients in a wavelet base corresponding to local modifications in the basic mesh, the device generating a total data stream enabling reconstruction of the object, wherein the device comprises:

means for partitioning the wavelet coefficients into at least two separated subsets, means for applying an independent encoding to each of the subsets, means for insertion, in the total data stream, of positioning data enabling identification of the wavelet coefficients relative to a portion of the objects in the total data stream, so as to enable a selective reconstruction of the portion by the coefficients of at least one of the subsets.

\* \* \* \* \*

UNITED STATES PATENT AND TRADEMARK OFFICE
CERTIFICATE OF CORRECTION

PATENT NO.         : 7,555,168 B2
APPLICATION NO. : 10/483441
DATED                : June 30, 2009
INVENTOR(S)       : Patrick Gioia It is certified that error appears in the above-identified patent and that said Letters Patent is hereby corrected as shown below:

<u>On Title Page, Item [22]</u>
delete "Jul. 4, 2002" and insert --Jul. 3, 2002--

<u>On Title Page, Item [57]</u>
Line 2,  delete "leas" and insert --least--

Line 12,  delete "a way to" and insert --a way as to--

Line 13,  delete "reconstruct" and insert --reconstruction--

<u>Column 12</u>
Line 11, delete "identify" and insert --identification--

<u>Column 14</u>
Line 18, delete "identify" and insert --idenp tification--

Signed and Sealed this

Third Day of November, 2009

David J. Kappos
*Director of the United States Patent and Trademark Office*